United States Patent
Kazuma et al.

[11] Patent Number: 6,167,187
[45] Date of Patent: Dec. 26, 2000

[54] SPEED CONTROLLING CIRCUIT OF DUBBING RECORDER AND DUBBING EQUIPMENT USING THE SPEED CONTROLLING CIRCUIT

[75] Inventors: Shuji Kazuma, Yawata; Kenji Masuda, Sanda, both of Japan

[73] Assignee: Matsushita Electric Industrial Co., Ltd., Osaka, Japan

[21] Appl. No.: 09/117,917

[22] PCT Filed: Dec. 3, 1997

[86] PCT No.: PCT/JP97/04411

§ 371 Date: Aug. 10, 1998

§ 102(e) Date: Aug. 10, 1998

[87] PCT Pub. No.: WO98/26588

PCT Pub. Date: Jun. 18, 1998

[30] Foreign Application Priority Data

Dec. 9, 1996 [JP] Japan ................................ 8-328131

[51] Int. Cl.[7] .............................. H04N 5/76; H04N 5/783
[52] U.S. Cl. ................................. 386/52; 386/66
[58] Field of Search ................................. 386/46, 52, 66, 386/68, 80, 81, 79; H04N 5/783, 5/76

[56] References Cited

U.S. PATENT DOCUMENTS

| | | | |
|---|---|---|---|
| 4,772,966 | 9/1988 | Sharples et al. | 386/66 |
| 5,040,081 | 8/1991 | McCutchen | 386/66 |
| 5,392,164 | 2/1995 | Takahashi | 386/52 |

FOREIGN PATENT DOCUMENTS

| | | |
|---|---|---|
| 57-185779 | 11/1982 | Japan . |
| 2-101664 | 4/1990 | Japan . |
| 5-191774 | 7/1993 | Japan . |
| 8-223521 | 8/1996 | Japan . |

*Primary Examiner*—Huy Nguyen
*Attorney, Agent, or Firm*—Ratner & Prestia

[57] ABSTRACT

A speed control circuit for a dubbing recorder includes a demodulation circuit which receives a video signal for dubbing from a master VTR, a sync separation circuit to separate a sync signal from the output signal of the demodulation circuit, a detection circuit to detect the frequency of a portion of the video signal using the sync signal, and a system control circuit to determine the speed mode of the master VTR based on the output signal of the detection circuit.

13 Claims, 4 Drawing Sheets

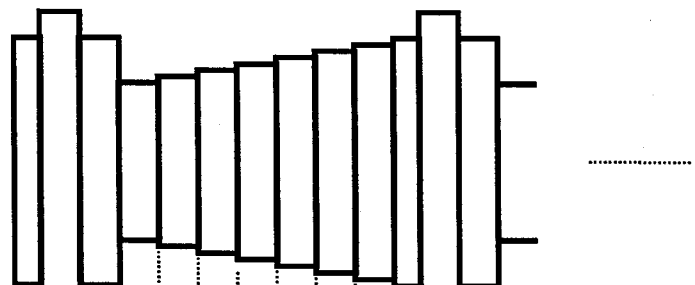
FIG. 2A
RF signal
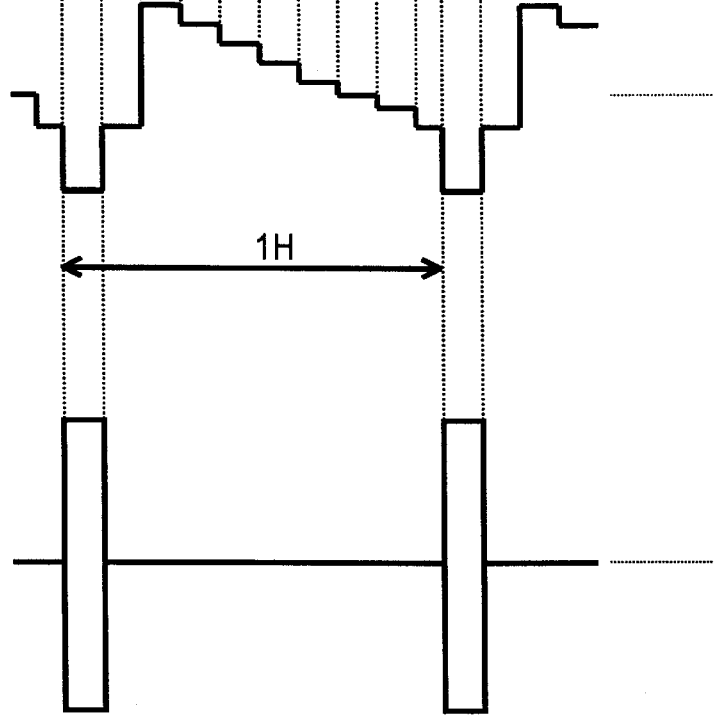
FIG. 2B
Video luminance signal
FIG. 2C
Signal obtained by
Gating with sync signal

SPEED CONTROLLING CIRCUIT OF DUBBING RECORDER AND DUBBING EQUIPMENT USING THE SPEED CONTROLLING CIRCUIT THIS APPLICATION IS A U.S. NATIONAL PHASE APPLICATION OF PCT INTERNATIONAL APPLICATION PCT/JP97/04411.

FIELD OF THE INVENTION

The present invention relates to a dubbing apparatus to duplicate video tapes on which video programs have been recorded, and in particular to a circuit to automatically switch dubbing speed of a dubbing recorder by detecting the frequency of a particular portion of the frequency modulated video signal to be used as the input for dubbing.

BACKGROUND OF THE INVENTION

Conventional video tape dubbing apparatus consists of a master VTR (Video Tape Recorder) to send out video signal for dubbing, a distributor to distribute the sent out video signal, and a number of dubbing recorders arranged in parallel to record the distributed video signal. The master VTR sends out video signal of either standard speed, i.e., same-speed, or double-speed signal, and a number of dubbing recorders corresponding to each speed perform dubbing.

Referring now to FIG. 4, the construction of a speed control circuit of a conventional dubbing recorder will be described in the following. In this figure, a frequency modulated video signal, namely, RF signal 1, which is distributed by a master VTR is modulated by a demodulation circuit 4, the output of which is then inputted to a sync separation circuit 5. The control of the recording speed is performed by inputting into a servo circuit 6 the output signal from the sync separation circuit 5 and the output signal from a system control circuit 3, thereby allowing recording of duplicated tapes at the same speed or the double speed. The dubbing apparatus in this arrangement is a dedicated apparatus for each respective speed and is not designed to record by switching a single apparatus between the same speed and double speed.

As an example of a dubbing apparatus, Japanese Laid-open Patent No. Hei 5191,774 discloses a high-speed dubbing apparatus. As this apparatus is a dedicated apparatus for a double speed, there has been a demand from users of the apparatus to allow them to duplicate at the standard speed by switching this same apparatus. When making a double-speed dubbing using the apparatus of this application, it is necessary to prepare 2 identical rolls of master tape. In the case of duplicating tapes in a small lot such as 100 to 5,000 rolls, dubbing at the standard speed will be acceptable, making it unnecessary to adopt double speed and to take the trouble of preparing 2 rolls of master tape. However, when using this apparatus, it is necessary to change dubbing recorder from a double-speed recorder to a same-speed dubbing recorder thereby presenting a cumbersome handling of dubbing recorders. Consequently, with this conventional example, too, there has been a demand for making it possible to switch between double-speed dubbing and same-speed dubbing using a same dubbing recorder and also for making handling of the apparatus easier.

SUMMARY OF THE INVENTION

To address the above described demand, the present invention intends to provide an apparatus by using a dubbing recorder in which the recording speed is detected from the frequency of a particular portion of the input signal for dubbing and in which the recording speed can be switched between the same speed and double speed or faster speed, based on the output of the detection circuit thereof the recording speed of the dubbing recorder is automatically switched to assure dubbing at a proper speed. The speed control circuit for a dubbing recorder in accordance with the present invention comprises a demodulation circuit to which video signal for dubbing is inputted from a master VTR, a sync separation circuit to separate sync signal from the output signal of the demodulation circuit, a detection circuit to detect the frequency of a particular portion of the video signal using the above sync signal, and a system control circuit to determine mode of speed of the master VTR based on the output signal of the detection circuit.

BRIEF DESCRIPTION OF THE DRAWINGS

FIG. 2 shows waveforms to describe operation of the present invention.

DESCRIPTION OF THE PREFERRED EMBODIMENTS

Figure 1:
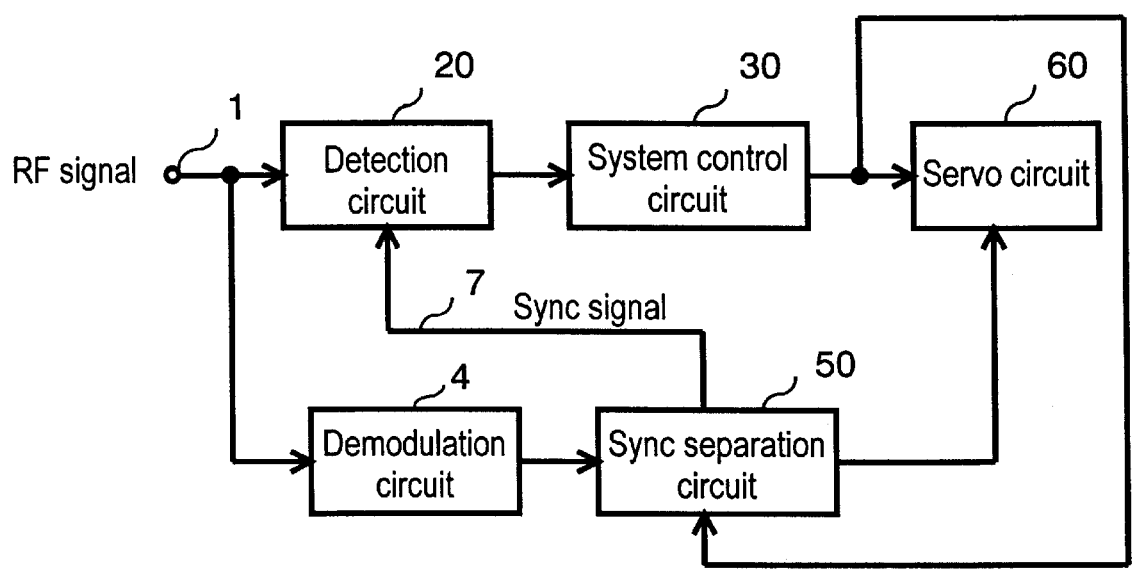
FIG. 1 is a block diagram showing construction of the speed control circuit of a dubbing recorder in an exemplary embodiment of the present invention.
Figure 3:
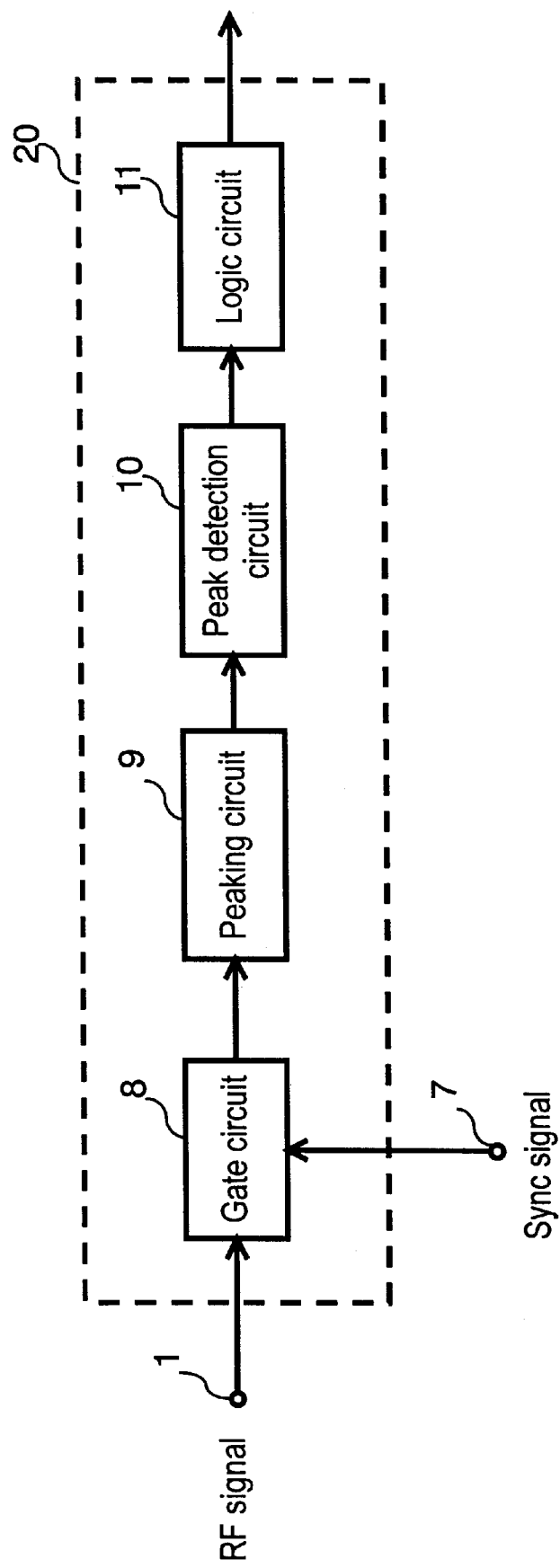
FIG. 3 is a detailed block diagram of the detection circuit 20 in FIG. 1.
Figure 4:
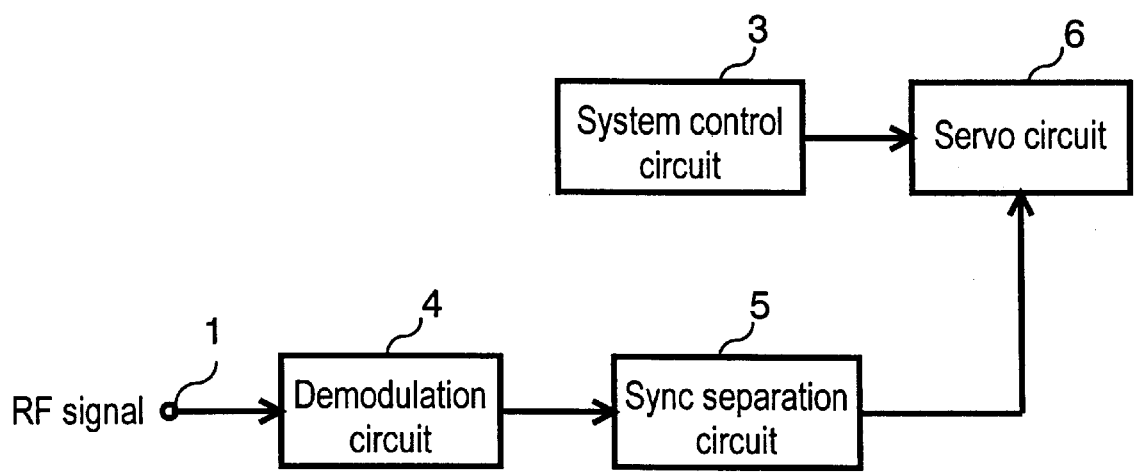
FIG. 4 is a block diagram showing construction of a speed control circuit of a conventional dubbing recorder.

FIGS. 1 to 3 are utilized to illustrate exemplary embodiments of the present invention.

The speed control circuit for a dubbing recorder in accordance with the present invention comprises a detection circuit 20 to detect the frequency of a particular portion of RF signal 1 which is a frequency modulated video signal sent out from a master VTR for the purpose of dubbing, a demodulation circuit 4 to demodulate RF signal 1, a system control circuit 30 which is inputted with the output signal of the detection circuit 20 to determine mode of speed, and a sync separation circuit 50, input of which is the output signals of the demodulation circuit 4 and the system control circuit 30, to separate sync signal 7 from the output signal of the demodulation circuit 4 and to send out its output to the detection circuit 20.

The object of control of the speed control circuit for dubbing recorders in accordance with the present invention is for example a servo circuit 60 of plural dubbing recorders. Depending on the output signal from the system control circuit 30, mode of speed of the servo circuit 60 is switched.

FIG. 3 shows a detailed block diagram of the detection circuit 20. The detection circuit 20 comprises a gate circuit 8 to which RF signal 1 and sync signal 7 are inputted, a peaking circuit 9 which is inputted with the output signal of the gate circuit 8, a peak detection circuit 10 which is inputted with the output signal of the peaking circuit 9, and a logic circuit 11 which is inputted with the output signal of the peak detection circuit 10.

FIG. 2A shows the waveform of RF signal 1, namely, frequency modulated video signal, FIG. 2B shows the waveform of video luminance signal, namely, output signal of the demodulation circuit 4, and FIG. 2C shows the waveform of a signal obtained by gating the RF signal 1 with the sync signal 7 in the gate circuit 8. In each figure, the abscissa represents time and the ordinate represents level of each respective signal.

In FIG. 1, when an RF signal 1 as shown in FIG. 2A is inputted to the demodulation circuit 4 and the detection circuit 20, a video luminance signal as shown in FIG. 2B is obtained as the output of the demodulation circuit 4, and the video luminance signal is inputted to the sync separation circuit 50. One of the outputs of the sync signal 7 of the sync separation circuit 50 is inputted to the gate circuit 8 within the detection circuit 20, where the sync signal portion of the RF signal 1 is gated to produce a signal as shown by the waveform of FIG. 2C, which is inputted to the peaking circuit 9. The other output (vertical sync signal, horizontal sync signal and color frame signal) of the sync separation circuit 50 is inputted to the servo circuit 60 as a reference signal for servo control of the dubbing recorder.

The frequency of the signal shown in FIG. 2C obtained by gating the RF signal 1 with the sync signal 7 in the gate circuit 8 is the frequency of the sync tip portion, namely, 3.4 MHz in the case of the standard speed of a VHS type VTR based on the NTSC television system, and 6.8 MHz in the case of double speed. In the case of a VTR based on the PAL television system, the frequency is 3.8 MHz for the standard speed and 7.6 MHz for double speed.

Consequently, in the event an RF signal 1 of VHS system standard speed is inputted, the signal level is enhanced by applying peaking at 3.4 MHz in the peaking circuit 9, the output of which is inputted to the peak detection circuit 10. In the peak detection circuit 10, a high level signal is obtained and is outputted to the logic circuit 11. In the logic circuit 11, the output of the peak detection circuit 10 is caused to change from a high level to, for example, a low level and is inputted to the system control circuit 30.

In the event an RF signal 1 having a frequency of 6.8 MHz, namely, twice the VHS system standard speed, is inputted, the signal level is not enhanced by applying peaking at 3.4 MHz in the peaking circuit 9, and the output is inputted to the peak detection circuit 10. In the peak detection circuit 10, a low level signal is obtained and is outputted to the logic circuit 11. In the logic circuit 11, the output of the peak detection circuit 10 is caused to change from a low level to, for example, a high level and is inputted to the system control circuit 30.

As described above, the system control circuit 30 determines, depending on the output level of the detection circuit 20, whether the recording is based on the standard speed or on double speed, and makes switching of related circuits (circuits to be controlled) of which the characteristics need to be switched. The circuits to be controlled include the servo circuit 60, sync separation circuit 50, audio circuit (not illustrated in drawing), and so on. Depending on the mode of servo, there are various configurations of circuits which need to be controlled by the system control circuit 30.

The above description referred to the peaking frequency of the peaking circuit 9 in the case of automatic switching between the standard speed and the double speed of the VHS system. By properly selecting the peaking frequency of the peaking circuit 9, automatic switching is also possible between the standard speed and triple or quadruple speed, or n-fold (n being an integer greater than 2) speed in general even in the case of the PAL system.

In this exemplary embodiment, a structure has been described in which the other output of the sync separation circuit 50 is inputted to the servo circuit 60 as a sync signal necessary for servo action. As embodiment of the present invention is not limited to this structure, it is also possible to operate the servo by inputting to the servo circuit 60 a sync signal from other part of the system.

In the foregoing description, the detection circuit 20 detects the frequency of a specific portion of the RF signal, namely, sync tip portion. In another embodiment of the present invention, one can use the pedestal portion of the video signal or burst portion of the color signal which has been converted to low-frequency region as the specific portion to be detected by the detection circuit 20. One can also use one of these specific portions alone or in combination.

Furthermore, by adopting a different construction of the detection circuit from of FIG. 3 in such a way that the frequency of a specific portion of the video signal is automatically detected, it becomes possible to determine not only two type of frequencies but also arbitrary frequencies, thereby allowing to determine between the NTSC and PAL systems as well as to automatically determine the number of multiplication of speed thus indicating that a dubbing recorder in which the speed mode is automatically switched depending on the video signal of the master VTR can be realized. The present invention encompasses a variety of modifications. Accordingly, all such modifications and variations are within the intended scope of the present invention as defined by the claims.

INDUSTRIAL APPLICABILITY

In the present invention, as has been described above, since the frequency of a specific portion of an inputted RF signal is detected and the output of the detection circuit is inputted to a system control circuit so that the speed mode can be automatically switched, it is not necessary to exchange a dubbing recorder to another dubbing recorder of different speed when the speed of a master VTR changes from the standard speed to double speed or higher speeds, or conversely from double speed or higher speeds to the standard speed, thus eliminating a failure in recording.

Also, even when the dubbing speed changes during a process of dubbing, the present invention makes it possible to automatically cope with the situation.

What is claimed is:

1. A speed control circuit for use with a video signal, a master video tape recorder, and a dubbing recorder, the circuit comprising:

demodulation means for receiving said video signal sent out for dubbing from said master video tape recorder, sync separation means for separating a sync signal from an output signal of said demodulation means, detection means for detecting a frequency of a portion of said video signal based upon said sync signal, and system control means to determine a speed mode of said master video tape recorder based on an output of said detection means.

2. The speed control circuit as recited in claim 1, wherein the frequency of the portion of said video signal is a frequency of the sync tip portion of the video signal.

3. The speed control circuit as recited in claim 1, wherein the frequency of the portion of said video signal is a frequency of a pedestal portion of the video signal.

4. The speed control circuit as recited in claim 1, wherein the frequency of the portion of said video signal is a frequency of a burst portion of a color signal converted to a low-frequency region.

5. The speed control circuit as recited in claim 1, wherein said detection means comprises:

gate means for gating said video signal sent out for dubbing from said master video tape recorder and the sync signal separated by said sync separation means, peaking means for peaking an output signal of said gate means at a predetermined frequency, peak detection means for detecting a peak value of an output signal of said peaking means, and a logic circuit for receiving an output signal of said peak detection means.

6. The speed control circuit as recited in claim 1, wherein said detection means automatically detects the frequency of the portion of the video signal sent out for dubbing from said master video tape recorder based on the sync signal separated by said sync separation means.

7. A dubbing apparatus for use with a master video tape recorder, a video signal, and a plurality of dubbing recorders, the apparatus comprising:

distribution means for distributing the video signal sent out from said master video tape recorder, and said plurality of dubbing recorders arranged for recording the distributed video signal, wherein the recording speed of each of said dubbing recorders is controlled by a speed control circuit including
- i) demodulation means receiving the video signal sent out for dubbing from said master video tape recorder,
- ii) sync separation means to separate a sync signal from an output of said demodulation means,
- iii) detection means for detecting a frequency of a portion of said video signal based upon said sync signal, and
- iv) system control means to determine a speed mode of said master video tape recorder based on an output signal of said detection means.

8. The dubbing apparatus as recited in claim 7, wherein the frequency of the portion of said video signal is a frequency of a sync tip portion of the video signal.

9. The dubbing apparatus as recited in claim 7, wherein the frequency of the portion of said video signal is a frequency of a pedestal portion of the video signal.

10. The dubbing apparatus as recited in claim 7, wherein the frequency of the portion of said video signal is a frequency of a burst portion of a color signal converted to a low-frequency region.

11. A dubbing apparatus for producing a duplicate tape from a video signal, said apparatus comprising:

a recorder for recording said duplicate tapes, detection means for detecting a frequency of a portion of said video signal based on a sync signal, demodulation means for receiving and demodulating said video signal, sync separation means for i) separating said sync signal from an output signal of said demodulation means and ii) for outputting said sync signal to said detection means, system control means for determining a speed of said recorder based on the output of said detection means, and switching means for switching the speed of said recorder in accordance with an output of said system control means.

12. A dubbing apparatus for producing a duplicate tape from a frequency modulated video signal, said apparatus comprising:

detection means for detecting a frequency of a portion of said video signal in accordance with a sync signal, demodulation means for receiving and demodulating said video signal, sync separation means for separating said sync signal from an output of said demodulation means and for outputting said sync signal to said detection means, system control means for determining a speed of a recorder which produces said duplicate tape based upon an output of said detection means, and servo means for switching the speed of said recorder in accordance with an output of said system control means.

13. A dubbing apparatus for producing a duplicate tape from a frequency modulated video signal, said apparatus comprising:

detection means for detecting a frequency of a portion of said video signal based on a sync signal, demodulation means for receiving and demodulating said video signal, sync separation means for separating said sync signal from an output of said demodulation means and for outputting said sync signal to said detection means, system control means for determining a speed of a recorder which produces said duplicated type based upon an output of said detection means, and servo means for switching the speed of said recorder in accordance with an output of said system control means, the servo means coupled to said sync separation means.

* * * * *